United States Patent [19]

Dorschner et al.

[11] Patent Number: 4,964,701
[45] Date of Patent: Oct. 23, 1990

[54] DEFLECTOR FOR AN OPTICAL BEAM

[75] Inventors: Terry A. Dorschner, Newton Centre; Daniel P. Resler, Wilmington, both of Mass.

[73] Assignee: Raytheon Company, Lexington, Mass.

[21] Appl. No.: 253,021

[22] Filed: Oct. 4, 1988

[51] Int. Cl.$^5$ ................................. G02F 1/13
[52] U.S. Cl. .................. 350/336; 350/331 R; 350/339 R; 350/347 V
[58] Field of Search ............... 350/336, 347 V, 339 R, 350/340, 341, 331 R

[56] References Cited

U.S. PATENT DOCUMENTS

| | | | |
|---|---|---|---|
| 3,791,716 | 2/1974 | Borel et al. | 350/347 V |
| 3,915,548 | 10/1975 | Opittek et al. | 350/334 |
| 4,066,334 | 1/1978 | Fray et al. | 350/347 V |
| 4,639,091 | 1/1987 | Hugnard et al. | 350/347 V |
| 4,824,215 | 4/1989 | Joseph et al. | 350/336 |

Primary Examiner—Stanley D. Miller
Assistant Examiner—Anita Pellman Gross
Attorney, Agent, or Firm—C. L. Maginniss; R. M. Sharkansky

[57] ABSTRACT

An optical beam phase shifter includes a liquid crystal cell having an optically-transparent common electrode on a first window and a multiplicity of parallel stripe electrodes on the second window. A multiplicity of control signals are applied between the individual stripe electrodes and the common electrode, thereby creating local variations of the refractive index of the liquid crystal molecules, which variations cause differential phase shifts across the cross section of a light beam incident thereon. The control signals are applied to contact pads affixed to an external surface of the liquid crystal cell, which contact pads underlie a plurality of the stripe electrodes. A multiplicity of conductors extend through the second window to couple the control signals to the stripe electrodes. In the first embodiment, the stripe electrodes are optically-transparent, and the incident beam is reflected from the contact pads. In a second embodiment, the stripe electrodes are reflective, and the incident beam is reflected therefrom.

22 Claims, 4 Drawing Sheets

DEFLECTOR FOR AN OPTICAL BEAM

BACKGROUND OF THE INVENTION

The present invention relates generally to optical systems and, more particularly, to an electrically tunable, optical phase shifter for use in an optical phased array antenna.

There are currently very pressing needs for rapid, large-angle pointing and scanning of laser beams of all wavelengths from the infrared through the ultraviolet. These needs include strictly military applications such as laser weapons, which require agile, high energy laser pointing, and laser radar, used for target acquisition and surveillance and for tracking and kill assessment. There are also purely commercial needs such as laser light shows and laser printing, which requires rapid, programmable beam steering. In addition, there are also many areas common to both military and commercial interests such as optical computing and image processing, which require rapid scanning of spatial light modulators, and optical data storage requiring rapid optical addressing. In most of these cases, the impediment to effective performance of the optical system is in the area of beam steering.

Presently available technologies are generally not sufficiently advanced to supply the need for rapid, large-angle pointing and scanning of optical beams and, in particular, of large diameter, diffraction limited carbon dioxide ($CO_2$) laser radar beams. In many systems, optical beam steering is currently performed using rotating optical elements. Such systems typically consist of galvanometer mirrors and a focal telescopes, performance being limited to beam diameters of somewhat less than six inches, a field of view of approximately five degrees in each direction, and a frame time of approximately one second with a few thousand resolution cells and open loop random access time in the order of ten milliseconds. The capability of handling larger beams is required for higher power systems, particularly for many of the military applications for $CO_2$ laser radar systems. Larger fields of view and larger apertures, on the order of one-half to one meter, are of great interest, and faster scan times are desired for many applications. In short, there exists a pressing need for an optical version of the versatile phased array antennas now widely used for microwave radar systems.

A static deflector for deflecting a polarized infrared beam is disclosed in U.S. Pat. No. 4,639,091, issued Jan. 27, 1987, to J.-P. Huignard et al. The Huignard et al. deflector comprises a layered square plate having as a front layer a window on which stripe electrodes are disposed. Both the window and the stripe electrodes are transparent to an incident infrared beam. A middle layer of the deflector comprises an electro-optical liquid crystal layer. The bottom layer comprises a substrate having a common electrode adjacent the liquid crystal layer. The common electrode is preferably reflective at the beam wavelength, illustratively it is a gold film; alternatively, for a deflector operating by transmission, a transparent rear plate may be used.

Huignard et al. discloses a periodic staircase waveform comprising N voltage steps which are applied to the stripe electrodes, thereby creating local variations of the refractive index in the liquid crystal layer in such a manner as to form a beam diffraction grating of adjustable period.

The Huignard et al. patent discloses a deflector device comprising a plurality of stripe electrodes, but it fails to disclose an effective way of coupling control voltages to a very large number of stripe electrodes, wherein the electrodes are pitched in the order of the wavelength of light of interest, typically 0.2 to 14 micrometers. Applicants believe that, for the dimensions expressed in the Huignard et al. patent for stripe electrode widths and inter-electrode spacings, there does not currently exist a practical and realizable means for attaching independent control voltages to stripe electrodes which are spaced more densely than approximately 10-20 per millimeter. Applicants anticipate the need for a deflector device wherein a multiplicity of stripe electrodes are pitched in the order of 5-10 micrometers, that is, a density of 100-200 stripe electrodes per millimeter, for operation with light having wavelength of ten micrometers. Clearly, an optical phased array antenna used for rapid, phased-angle pointing and scanning of large diameter laser radar beams, as described earlier, would require a large multiplicity of stripe electrodes, and a correspondingly large plurality of means for coupling control voltages individually to those stripe electrodes.

As an example, a one-half meter aperture phase shifter array, operating on light having wavelength of 10 $\mu$meters, requires contacts for 100,000 electrodes, or 2,000 electrodes per centimeter. In order to operate the same phase shifter array at 1 $\mu$meter wavelength, contacts for one million electrodes would be required, or 20,000 electrodes per centimeter.

SUMMARY OF THE INVENTION

It is therefore a primary object of the present invention to provide an improved optical beam phase shifter.

It is a further object of this invention to provide an optical phase shifter which is an improvement over the prior art in that it includes a large multiplicity of stripe electrodes, thereby providing rapid, large-angle deflection of large diameter laser radar beams.

It is a still further object of this invention to provide a practical and realizable means for coupling individual control voltages to such a large multiplicity of stripe electrodes.

These and other objects of this invention are obtained generally by providing an apparatus for deflecting an optical beam. The apparatus comprises an optical element including a first window having a transparent common electrode, a second window having a multiplicity of electrodes in the form of electrically-isolated parallel stripes, and a layer of liquid crystal molecules intermediate the first and second windows. The optical element is positioned so that the optical beam is incident on the first window, the beam being reflected from within the optical element. The apparatus further comprises means for generating a multiplicity of control signals, and means for applying the control signals individually between the multiplicity of stripe electrodes and the common electrode, thereby creating local variations of refractive index in the liquid crystal layer.

The applying means preferably comprises an electrically-insulating layer affixed to the optical element opposite the first window; a multiplicity of electrically-conductive contact pads on an external surface of the insulating layer, each of the pads underlying a plurality of the stripe electrodes; and a multiplicity of conductors, each extending through the insulating layer for providing electrical conductivity between an individual stripe electrode and a corresponding contact pad.

In accordance with a first embodiment, the parallel stripe electrodes are optically transparent, and the incident optical beam passes through these electrodes and the insulating layer, and is reflected from the closely-spaced, metallic contact pads thereunder. In accordance with a second embodiment, the parallel stripe electrodes are optically reflective, and the incident optical beam is reflected therefrom.

BRIEF DESCRIPTION OF THE DRAWINGS

The foregoing features of the present invention, and the advantages thereof, may be fully understood from the following detailed description, read in conjunction with the accompanying drawings, wherein.

DETAILED DESCRIPTION OF THE PREFERRED EMBODIMENTS

Figure 1:
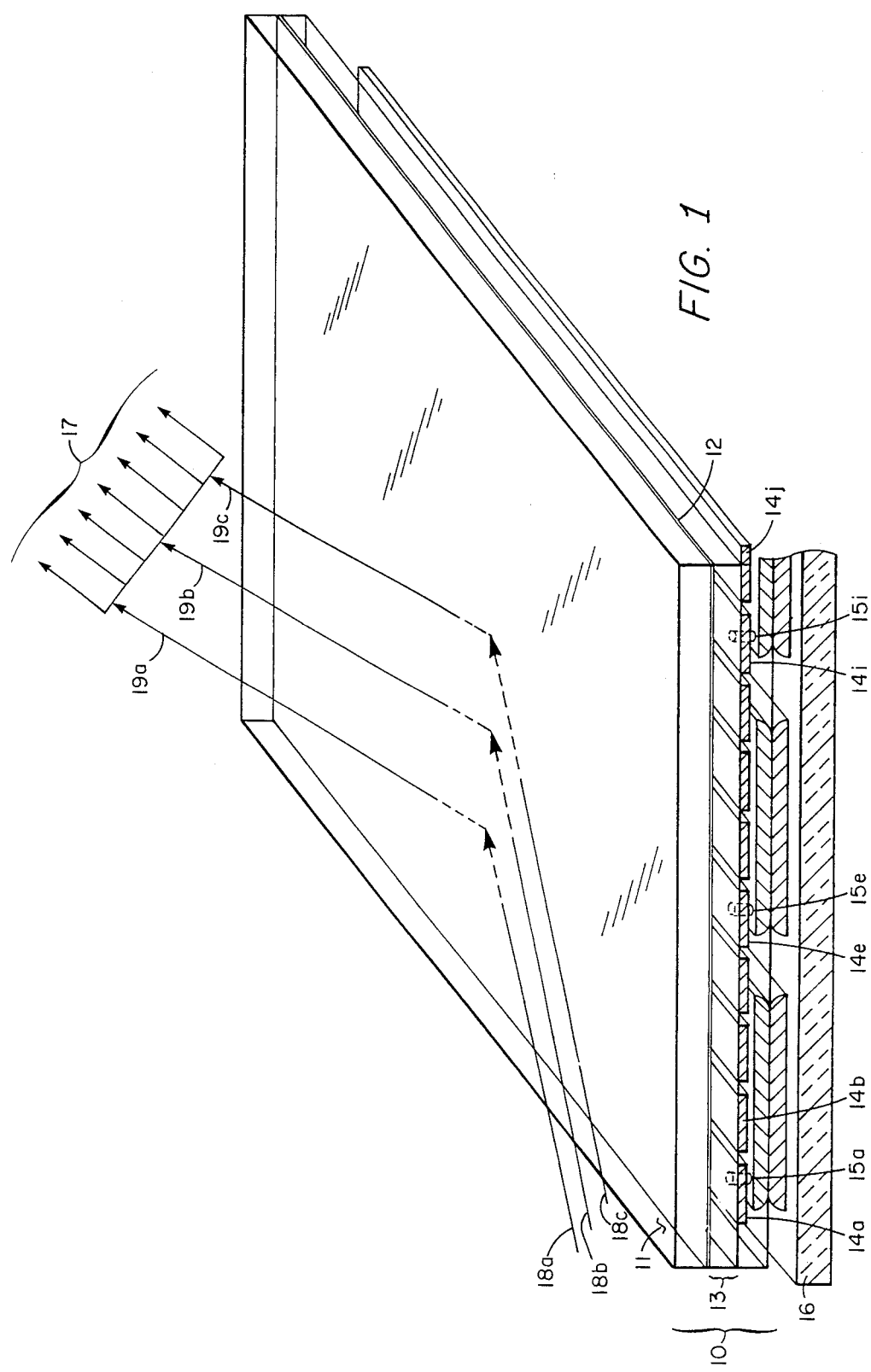
FIG. 1 is an isometric view of an optical beam phase shifter according to the present invention.

Referring to FIG. 1, there is shown a simplified and dimensionally exaggerated isometric view of an optical beam phase shifter according to the principles of the present invention. The phase shifter includes an optical subsystem 10 and an electronics module 16. Optical subsystem 10 includes an optically-transparent common electrode 12, a multiplicity of stripe electrodes 14a, 14b, ..., 14j, and a lay of liquid crystal molecules 13 therebetween. Electronics module 16 supplies appropriate control signals to electrodes 14a, 14b, ..., 14j, referred to collectively as electrodes 14, via conductors 15a, 15b, ..., 15j, referred to collectively as conductors 15, respectively (only conductors 15a, 15e and 15i are visible in FIG. 1).

The optical beam phase shifter of FIG. 1 is responsive to a light source and beam forming network (not shown) which provide a polarized, coherent light beam, typically in the infrared spectrum, having a typical wavelength in the range of 9 to 11.5 $\mu$meters ($\mu$m), illustratively at 10.6 $\mu$m. The light beam, represented in part by rays 18a, 18b and 18c, is directed obliquely onto the upper surface 11 of optical subsystem 10 such that its projection onto the plane formed by stripe electrodes 14 is parallel to the direction of electrodes 14. In other words, the longitudinal edges of stripe electrodes 14 are parallel to the planes of incidence of rays 18a, 18b and 18c.

It is characteristic of liquid crystal molecules that the application of an electric field affects the retardance, and hence, the speed of light propagated therethrough. Thus, in the simplified example of FIG. 1, the application of different potentials individually to stripe electrodes 14 results in differential electric fields in the regions between electrodes 14 and common electrode 12, thereby creating local variations of the refractive index in the liquid crystal layer 13. For ease of understanding, a limited number of stripe electrodes 14 are shown in FIG. 1; whereas in an actual phase shifter embodying the present invention, there may be many thousands of stripe electrodes.

In the present simplified example, the potentials applied to the electrodes 14 onto which rays 18a, 18b and 18c are incident, are such as to cause the greatest retardation to reflected ray 19c, and the least retardation to reflected ray 19a. Thus, the wavefront 17 of the beam reflected from within the optical beam deflector appears to be deflected from the normal plane of incidence/reflection. It is therefore seen that the optical beam deflector of FIG. 1 provides selective beam steering in accordance with the electrical potentials applied to stripe electrodes 14.

The application of control voltage signals to the individual stripe electrodes 14 for the purpose of beam steering is analogous to the methods used in conventional microwave radar beam steering as taught, for example, in *Radar Handbook*, M.I. Skolnik, ed., McGraw-Hill, New York, 1970, at chapter 11. Illustratively, a plurality of control voltage signals, being periodic in space and having a continuous progression of voltage steps within each period between a minimum value and a maximum value, may be applied to the multiplicity of stripe electrodes 14. However, it is not intended to limit the present invention only to pluralities of control voltage signals which are periodic.

Figure 2:
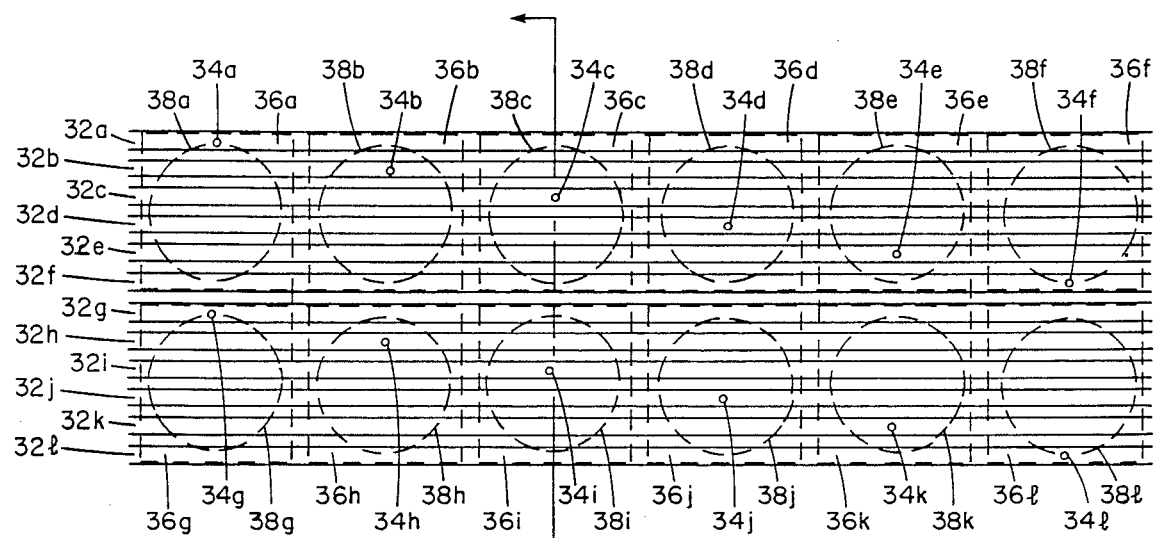
FIG. 2 is a plan view of a first embodiment of the optical subsystem of the optical beam phase shifter of FIG. 1.
Figure 3:
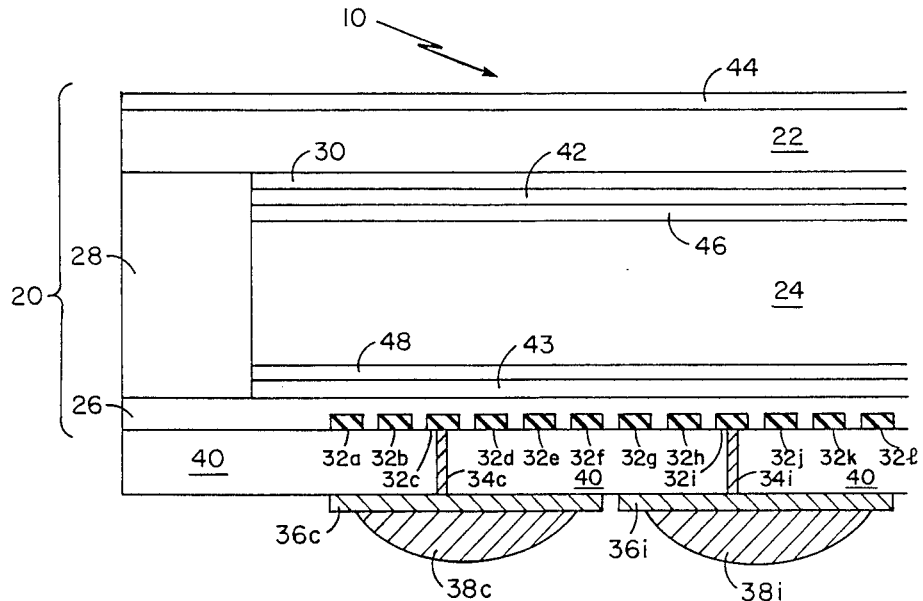
FIG. 3 is a cross-sectional view of the FIG. 2 embodiment.

In a first embodiment, to be described in relation to FIGS. 2 and 3, the parallel stripe electrodes are substantially optically transparent, and the incident light beam passes through these electrodes and is reflected by a discontinuous optically-reflective layer thereunder comprising a plane of closely-spaced metallic contact pads. In this first embodiment, the narrow spacing between the contact pads is minimized in order to minimize any extraneous grating patterns which may exist. In a second embodiment, to be described in relation to FIG. 5, the parallel stripe electrodes are optically reflective, and the incident light beam is reflected therefrom. In this second embodiment, the narrow spacing between the stripe electrodes is minimized in order to minimize a fixed secondary grating which may exist.

Referring to FIGS. 2 and 3, there is shown, respectively, a plan view and a sectional view of the optical subsystem 10 of the optical beam deflector of FIG. 1. It will be recognized that no effort has been made to provide accurate scale to FIGS. 2 and 3, and that some dimensions are highly exaggerated in order to clearly depict all of the structural elements.

The optical subsystem 10 of the optical phase shifter of the present embodiment comprises a liquid crystal cell 20 affixed to an electrically-insulating layer 40. Liquid crystal cell 20 comprises a first window 22, a second window 26, spacer 28 maintaining a fixed spacing between windows 22 and 26, and a layer 24 of liquid crystal molecules in the space between windows 22 and 26. Window 22 includes optically-transparent common electrode 30, and window 26 includes a plurality of optically-transparent electrodes 32a, 32b, ..., 32$\lambda$, referred to collectively as electrodes 32, in the form of electrically-isolated parallel stripes. Illustratively, electrodes 32 may be 4–10 $\mu$meters in width, and spaced from one another by approximately one $\mu$meter.

Electrically-insulating layer 40, which may illustratively be fabricated of a dielectric material such as zinc sulfide (ZnS) or semi-insulating gallium arsenide (GaAs), provides electrical isolation between electrodes 32 and the metallic contact pads (to be described below). It is a requirement that the material of insulating layer 40 be substantially optically transparent at the wavelength of the light as described. An anti-reflection coating 44 is affixed to the external surface of window 22, and anti-reflection coatings 42 and 43 are affixed, respectively, to the inner surfaces of windows 22 and 26. Alignment layers 46 and 48 are interposed between the layer 24 of liquid crystal molecules and cell windows 22 and 26, respectively, to properly align the liquid crystal molecules at the boundaries of layer 24. The alignment of the liquid crystal molecules is selected to be appropriate to the polarization of the incident light such that liquid crystal cell 20 functions properly as a switch. It has been determined that a preferable alignment of the liquid crystal molecules is orthogonal to the longitudinal edges of the stripe electrodes 32. The presence of the inevitable fringing fields between electrodes 32 will reinforce the original molecular alignment established by the alignment layers 46 and 48.

Conductors $34a$, $34b$, ..., $34\lambda$, referred to collectively as conductors 34 (only $34c$ and $34i$ are shown in the view of FIG. 3), provide electrical paths between electrodes 32 and pads $36a$, $36b$, ..., $36\lambda$, referred to collectively as pads 36 (only $36c$ and $36i$ are shown in FIG. 3), through insulating layer 40. Each individual pad 36 includes a protrusion or "bump" $38a$, $38b$, ..., $38\lambda$, referred to collectively as bumps 38 (only $38c$ and $38i$ are shown in FIG. 3), to be used for bonding to an individual source of control voltage, in a manner to be described hereinafter.

In the present example, in which the optical beam incident on deflector 10 is provided from a $CO_2$ laser, cell windows 22 and 26 must exhibit low absorption of the infrared light having the wavelength emitted by a $CO_2$ laser, typically at 10.6 μm. Typical candidates for the choice of cell windows 22 and 26 include semiconductors such as germanium, zinc selenide and gallium arsenide, and halide salts such as potassium chloride, all of which are relatively transparent to $CO_2$ laser light. In addition, electrode 30, which provides electrical conductivity across cell window 22, and electrodes 32, which provide a multiplicity of individual zones of electrical conductivity on cell window 26, must also be substantially optically transparent at the above-mention wavelength.

It is known by those skilled in the art to form an optically transparent electrode by the deposition of a thin-film conductor, such as indium-tin oxide (ITO) or indium oxide ($In_2O_3$), on a surface of a plate of transparent material. Such conductive films are inherently lossy in the infrared region, that is, they absorb the infrared energy, due to their high electron concentrations and low carrier mobilities. An indium tin oxide film a few thousand Angstroms-thick transmits approximately 80-90 percent in the visible spectrum, and a 200 Angstrom-thick film transmits approximately 50 percent at a wavelength of 10.6 μm. It has been reported that indium oxide provides 65–80 percent transmission at wavelengths between 8–12 μm with film sheet resistances of 20–50 ohms/square.

Alternatively, one might deposit transparent semiconductor material on an insulating transparent substrate, such as KCl, in the required electrode pattern. Difficulties then arise when coating the substrate with an anti-reflective material, due to an almost certain optical refractive index mismatch between the semiconductor electrodes and the substrate In the present example, optically transparent electrodes 30 and 32 are preferably provided on cell windows 22 and 26 by a process of ion implantation, as disclosed in co-pending U.S. Pat. application, Ser. No. 162,922, "Liquid Crystal Cell Windows," filed Mar. 2, 1988, and assigned to the same assignee as the present invention, which application is incorporated herein by reference.

Anti-reflective layers 42, 43 and 44 reduce the reflections when light passes from one optically-transmissive medium to another. Single layer and multiple anti-reflective coatings are well known in the art and are used to effectively eliminate reflections. Ideally, a single layer anti-reflective coating comprises a material whose refractive index is the geometric mean of the refractive indices of the two media to be matched. By way of example, anti-reflective layer 44 at the out surface of a germanium (n=4.0) cell window 22 may comprise a quarter-wavelength coating of zinc sulfide (n=2.2). Further, by way of example, anti-reflective layers 42 and 43 at the inner surfaces of cell windows 22 and 26 may comprise zinc selenide (n=2.4), to nearly match to the liquid crystal film (n=1.7). In most instances, as with the halide windows, the refractive indices of cell windows 22 and 26 and the liquid crystal molecules of layer 24 may be sufficiently close that inner anti-reflective layers 42 and 43 are not necessary.

In order to exhibit the desired birefringence in bulk devices, the liquid crystals must be properly and uniformly aligned. This is usually done by special treatment of the surfaces of cell windows 22 and 26 adjacent layer 24. If the inner surfaces of cell windows 22 and 26 have been "prepared" or striolated by, for example, rubbing unidirectionally with fine grinding powder to produce extremely fine, parallel striolae, the liquid crystal molecules of layer 24 adjacent to the inner surfaces of cell windows 22 and 26 will tend to align themselves along and in these minute grooves and thereby be preferentially aligned. If cell 20 is thin, as is the usual case, and if the grooves on the inner surfaces of cell windows 22 and 26 are parallel, as in this example, this positional orientation is transferred across the cell by the natural tendencies of the liquid crystal molecules to align parallel to one another. Typical depths of the striolae are only a few Angstrom units, to match the effective diameters of the liquid crystal molecules. An alternate means of preparing the inner surfaces of cell windows 22 and 26 is ion beam deposition of dielectric layers 46 and 48 at a near grazing angle to produce small parallel ripples in their surfaces adjacent layer 24. This shallow angle deposition technique is currently the preferred technique. With either method, the striolae are so much smaller than a wavelength that they contribute negligible scatter, even in the visible spectrum; therefore, scatter in the infrared is quite insignificant.

The liquid crystal molecules of layer 24 within cell 20 are, illustratively, long, thin, rod-like organic molecules of the so-called "nematic" phase. These molecules exhibit long range molecular order in the liquid state.

Considering now the means for providing control voltages to the individual stripe electrodes 32, FIG. 2 shows most advantageously the relationships between electrodes 32, conductors 34 and pads 36. Since it is clear that for the widths of electrodes 32 expressed above, there exists no practical and realizable method in the state-of-the-art to affix individual leads to each of a great number of such electrodes, the present invention discloses relatively large contact pads 36 underlying stripe electrodes 32, and whose widths span a number of stripe electrodes 32, illustratively six in the present example. In the present embodiment, it is a requirement that contact pads 36 be as closely-spaced as is practicable, since the surface of the totality of pads adjacent insulating layer 40 forms the reflective surface for the reflection of the incident light beam. Contact pads 36 are preferably made of gold. Each pad 36 is electrically coupled to a single electrode 32 by a conductor 34, which may typically be deposited into a via hole. Conductors 34 are typically spaced apart in the staggered configuration as shown in FIG. 2. The via holes into which conductors 34 are deposited may typically have a diameter of 0.5–1.0 μmeter.

Bumps 38, typically substantially round, convex deposits of indium, are deposited on pads 36. Bumps 38 preferably have a diameter slightly less than the length of a side of pad 36, so that when bumps 38 are "welded" by the application of pressure between corresponding bumps, they may expand slightly without being shorted to one another.

An illustrative process for fabricating the optical subsystem 10 according to this embodiment includes ion implantation of the stripe electrodes in a gallium arsenide wafer, typically in accordance with the teachings of U.S. Pat. application, Ser. No. 162,922. The electrode side of the wafer is then coated with a dielectric, for example, ZnS or $Y_2O_3$, to a thickness of between a few hundred Angstroms and several μmeters, i.e., just enough to provide a good insulator.

Via holes are formed through the insulating layer using, for example, E-beam photoresist technology for best resolution. The external surface of the insulating layer is overcoated with a conductor, typically gold, ensuring that the conductor fills the via holes so as to make contact with the implanted electrodes. The gold is then etched to form the individual contact pads, and indium bumps are deposited on each contact pad.

After "bumping" the GaAs wafer to the electronics module (as described hereinafter) and backfilling the assembly with strengthening epoxy, the wafer is turned over and the GaAs is lapped down to a very thin layer, illustratively one μmeter. The lapped surface is polished and one or more anti-reflective coatings are applied. Over this, an alignment layer is applied, and the liquid crystal cell is then assembled, including spacers, the remaining cell window including the common electrode, anti-reflection coatings, and liquid crystal molecules, according to known techniques.

Figure 4:
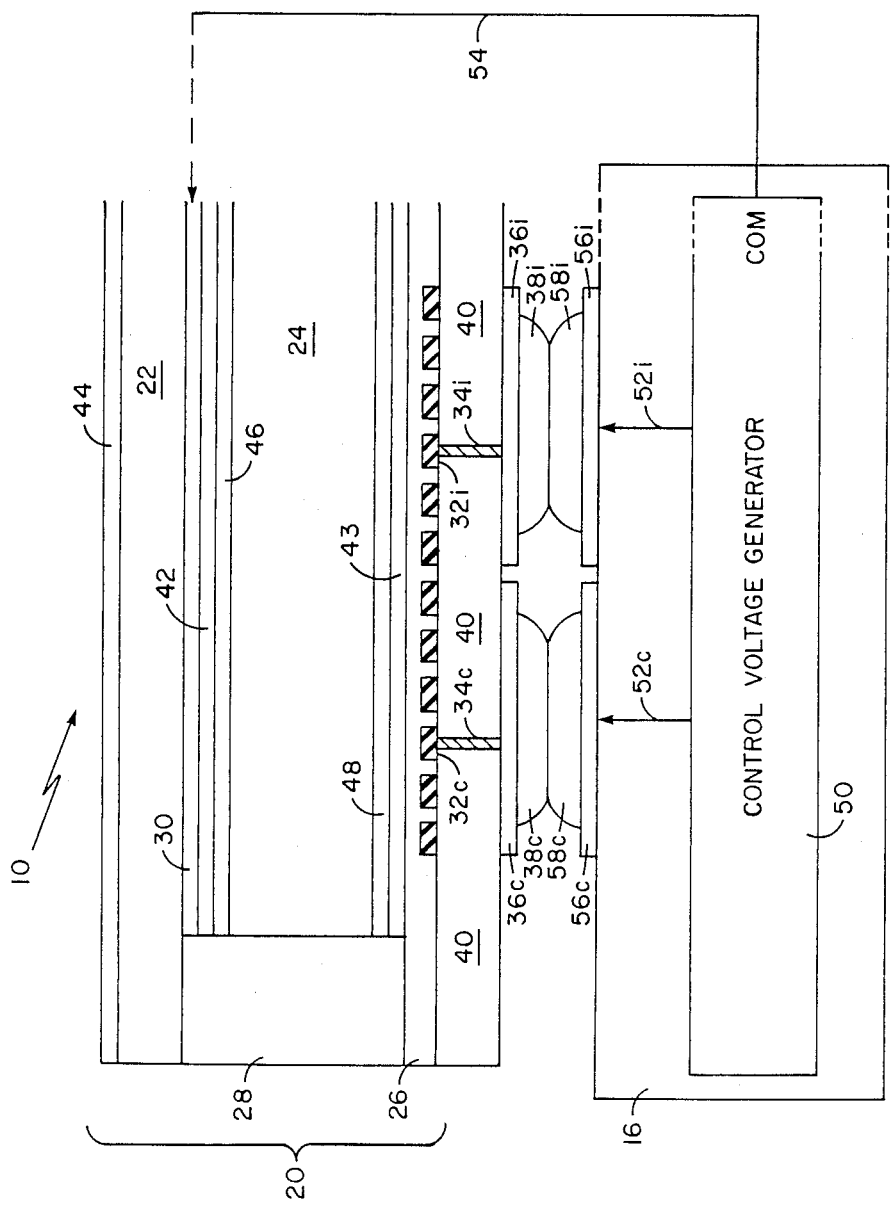
FIG. 4 is a side view and block diagram representation of the optical beam phase shifter of FIG. 1.

Referring now to FIG. 4, there is shown a side view and block diagram representation of the optical beam phase shifter of the present invention, with particular focus on the means for coupling the individual control signals from electronics module 16 to the stripe electrodes 32. Electronics module 16 includes a control voltage generator 50, which applies selectable voltages to each of a large plurality of output ports, which ports are coupled via signal leads (represented in FIG. 4 by leads 52c, 52i) to a corresponding large plurality of contact pads (represented in FIG. 4 by pads 56c, 56i) on an outer surface of electronics module 16. Each of the contact pads 56 on electronics module 16 corresponds in position to a contact pad 36 on optical subsystem 10. Each contact pad 56c, 56i on electronics module 16 includes a bump (represented in FIG. 4 by bumps 58c, 58i), typically a substantially round, convex deposit of indium, each bump 58c, 58i corresponding in position to a bump (represented in FIG. 4 by bumps 38c, 38i) on optical subsystem 10.

Fabrication of the optical beam phase shifter of the present invention is completed by positioning optical subsystem 10 and electronics module 16 so that bumps 38 and 58 are aligned, and elements 10 and 16 are urged together under sufficient pressure to cause the pairs of indium bumps 38 and 58 to be welded. Finally, the control voltage circuit is completed by connection of the common voltage output port (COM) of control signal generator 50 to the common electrode 30 of optical subsystem 10 via lead 54.

Considering now some representative examples of optical beam deflectors which relate the sizes of the substrate to the spacings between the metal contact pads. First, given a substrate having a usable area comprising a square 1.0 cm on a side, and having 8 μmeter center-to-center electrode spacing, the substrate will contain 1250 electrode stripes. An array of approximately 35-by-35 contact pads will be required at the bottom surface of the substrate, which array will occur on 283 μmeter centers in two dimensions.

If the dimensions of the usable area on the optical beam deflector substrate are increased to 10 cm square, the substrate will contain 12,500 electrode stripes, for the same electrode pitch as above. For this case, an array of approximately 112-by-112 contact pads will be required at the bottom of the substrate, which array will occur on 894 μmeter centers in two dimensions. It is therefore seen that as the substrate size increases, the linear dimensions available for each contact pad increases by the square root of the linear factor of substrate size increase.

Figure 5:
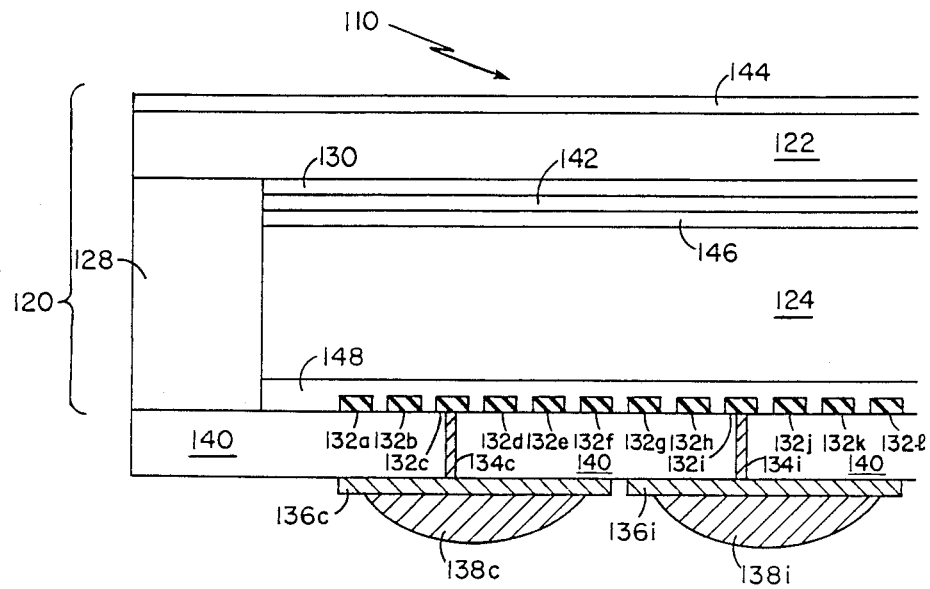
FIG. 5 is a cross-sectional view of a second embodiment of the optical subsystem of the optical beam phase shifter of FIG. 1.

Referring to FIG. 5, there is shown a cross-sectional view of a second embodiment of the optical subsystem of the optical beam deflector of the present invention. This embodiment is characterized in that the parallel stripe electrodes are optically reflective, and the incident light beams are reflected therefrom, obviating the need for a separate reflection layer, as in the FIGS. 2–3 embodiment.

Optical subsystem 110 comprises a liquid crystal cell 120 including a window 122, spacer 128 maintaining a fixed spacing between window 122 and insulating substrate 140, and a layer 124 of liquid crystal molecules in the space between window 122 and insulating substrate 140. Window 122 includes an optically-transparent common electrode 130, and insulating substrate 140 includes a multiplicity of optically-reflective electrodes 132a, 132b, ..., 132λ, referred to collectively as electrodes 132, in the form of closely-spaced electrically-isolated parallel stripes. Illustratively, for operation at a 10 μmeter wavelength, electrodes 132 may be 4–10 μmeters in width, and spaced from one another by approximately one μmeter.

Anti-reflection coatings 142 and 144 are affixed, respectively, to the internal and external surfaces of window 122. Alignment layers 146 and 148 are interposed between the layer 124 of liquid crystal molecules and cell window 122 and optically-reflective electrodes 132, respectively, to properly align the liquid crystal molecules at the boundaries of layer 124.

Conductors 134 (only 134c and 134i are shown in the view of FIG. 5) provide electrical paths between electrodes 132 and contact pads 136 (only 136c and 136i are shown in FIG. 5), through insulating substrate 140. Each individual contact pad 136 includes a protrusion or bump 138 (only 138a and 138i are shown in FIG. 5), to be used for bonding to an individual source of control voltage, in a manner substantially identical to that described in relation to the embodiment of FIGS. 2–3.

In the present embodiment, common electrode 130 is preferably fabricated according to the process described in the referenced U.S. Pat. application, Ser. No. 162,922, and the metal reflective electrodes are illustratively fabricated using a metal deposition process. The use of anti-reflection layers 142 and 144, and alignment layers 146 and 148 is governed by the same principles described in relation to the embodiment of FIGS. 2–3.

The process for fabricating the optical subsystem 110 according to this embodiment includes providing metal contact pads to be used as the electrodes for the application of the individual control voltages on an insulating substrate, such as alumina or gallium arsenide (GaAs). Via holes are then formed through the substrate to the metal contact pads using, illustratively, laser drilling, for the case of an alumina substrate, or techniques such as ion milling and reactive ion etching, for the case of a GaAs substrate. The via holes may be filled using a selective metal deposition technique.

Reflective, conductive metal stripe electrodes, illustratively of gold, are then deposited on the surface of the insulating substrate opposite the surface having contact pads, each stripe making electrical contact with the fill metal of a single via hole. An alignment layer for the liquid crystal molecules is deposited over the stripe electrodes and the liquid crystal cell is then assembled, including spacers, cell windows, anti-reflection coatings, and liquid crystal molecules, according to known techniques. It will be recognized that the indium bumps may be applied to the metal contact pads at virtually any point in this process.

While the principles of the present invention have been demonstrated with particular regard to the illustrated structure of the figures, it will be recognized that various departures from such illustrative structure may be undertaken in the practice of the invention. The scope of this invention is not intended to be limited to the structure disclosed herein but should instead by gauged by the breadth of the claims which follow.

What is claimed is:

1. Apparatus for deflecting on optical beam, said apparatus comprising:
   an optical element including a first window having an optically-transparent common electrode, a second window having a multiplicity of electrodes in the form of electrically-isolated parallel stripes, and a layer of liquid crystal molecules intermediate said first and second windows,
   said optical element positioned so that said optical beam is incident on said first window, said beam being reflected from within said optical element;
   means for generating a multiplicity of control signals; and
   means for applying said control signals individually between said multiplicity of stripe electrodes and said common electrode, thereby creating local variations of refractive index in said liquid crystal layer, said applying means comprising:
   an electrically-insulating layer affixed to said optical element opposite said first window;
   a multiplicity of electrically-conductive contact pads on an external surface of said insulating layer, each of said pads underlying a plurality of said stripe electrodes; and
   a multiplicity of conductors, each extending through said insulating layer for providing electrical conductivity between an individual stripe electrode and a corresponding pad.

2. The apparatus according to claim 1 wherein said optically-transparent common electrode is provided on said first window by ion implantation.

3. The apparatus according to claim 1 further including a multiplicity of convex metallic protrusions coupled individually to each of said contact pads.

4. The apparatus according to claim 3 wherein said metallic protrusions are indium.

5. The apparatus according to claim 1 wherein said multiplicity of stripe electrodes are substantially transparent to light having wavelength of said optical beam.

6. The apparatus according to claim 5 wherein said multiplicity of transparent stripe electrodes are provided on said second window by ion implantation.

7. The apparatus according to claim 5 wherein said contact pads are metallic and wherein the surfaces of said multiplicity of contact pads adjacent said insulating layer are closely-spaced so as to comprise a reflective plane for the reflection of said incident optical beam.

8. The apparatus according to claim 1 wherein said multiplicity of stripe electrodes are optically-reflective of light having wavelength of said optical beam.

9. The apparatus according to claim 8 wherein said applying means comprises:
   a multiplicity of electrically-conductive contact pads on an external surface of said second window, each of said pads underlying a plurality of said stripe electrodes; and
   a multiplicity of conductors, each extending through said second window for providing electrical conductivity between an individual stripe electrode and a corresponding contact pad.

10. The apparatus according to claim 1 further including alignment layers on said first and second windows adjacent said layer of liquid crystal molecules, said alignment layers providing preferential alignment of said liquid crystal molecules in a direction orthogonal to the longitudinal edges of said stripe electrodes.

11. Apparatus for deflecting an optical beam, said apparatus comprising:
    an optical element including a first window having an optically-transparent common electrode, a second window having a multiplicity of optically-transparent electrodes in the form of electrically-isolated parallel stripes, and a layer of liquid crystal molecules intermediate said first and second windows,
    said optical element positioned so that said optical beam is incident on said first window, said beam being reflected from within said optical element;
    means for generating a multiplicity of control signals; and
    means for applying said control signals individually between said multiplicity of transparent stripe electrodes and said common electrode, thereby creating local variations of refractive index in said liquid crystal layer, said applying means comprising: an electrically-insulating layer affixed to said second window; a multiplicity of closely-spaced, electrically-conductive contact pads on a surface of said insulating layer opposite said reflecting means, each of said pads underlying a plurality of said stripe electrodes, the surfaces of said contact pads adjacent said insulating layer reflecting said incident optical beam therefrom; and a multiplicity of conductors, each extending through said insulating layer for providing electrical conductivity between an individual stripe electrode and a corresponding pad.

12. The apparatus according to claim 11 wherein said optically-transparent common electrode is provided on said first window by ion implantation.

13. The apparatus according to claim 11 wherein said multiplicity of transparent stripe electrodes are provided on said second window by ion implantation.

14. The apparatus according to claim 11 further including a multiplicity of convex metallic protrusions coupled individually to each of said contact pads.

15. The apparatus according to claim 14 wherein said metallic protrusions are indium.

16. The apparatus according to claim 11 further including alignment layers on said first and second windows adjacent said layer of liquid crystal molecules, said alignment layers providing preferential alignment of said liquid crystal molecules in a direction orthogonal to the longitudinal edges of said stripe electrodes.

17. Apparatus for deflecting an optical beam, said apparatus comprising:
an optical element including a first window having an optically-transparent common electrode, an electrically-insulating second window having a multiplicity of electrodes in the form of electrically-isolated parallel stripes, and a layer of liquid crystal molecules intermediate said first and second windows,
said optical element positioned so that said optical beam is incident on said first window, said beam being reflected from within said optical element:

means for generating a multiplicity of control signals; and
means for applying said control signals individually between said multiplicity of stripe electrodes and said common electrode, thereby creating local variations of refractive index in said liquid crystal layer, said applying means comprising: a multiplicity of electrically-conductive contact pads on a surface of said second window opposite said stripe electrodes, each of said pads underlying a plurality of said stripe electrodes; and a multiplicity of conductors, each extending through said second window for providing electrical conductivity between an individual stripe electrode and a corresponding contact pad.

18. The apparatus according to claim 17 wherein said optically-transparent common electrode is provided on said first window by ion implantation.

19. The apparatus according to claim 17 wherein said multiplicity of stripe electrodes are optically-reflective of light having wavelength of said optical beam.

20. The apparatus according to claim 17 further including a multiplicity of convex metallic protrusions coupled individually to each of said contact pads.

21. The apparatus according to claim 20 wherein said metallic protrusions are indium.

22. The apparatus according to claim 17 further including alignment layers on said first and second windows adjacent said layer of liquid crystal molecules, said alignment layers providing preferential alignment of said liquid crystal molecules in a direction orthogonal to the longitudinal edges of said stripe electrodes.

* * * * *